L. B. LARSEN.
POCKET KNIFE.
APPLICATION FILED APR. 13, 1911.
1,087,788.
Patented Feb. 17, 1914.
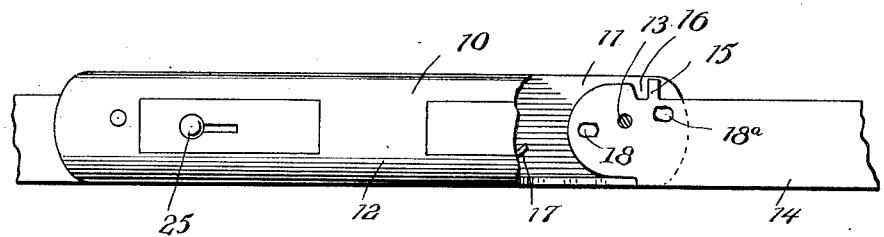
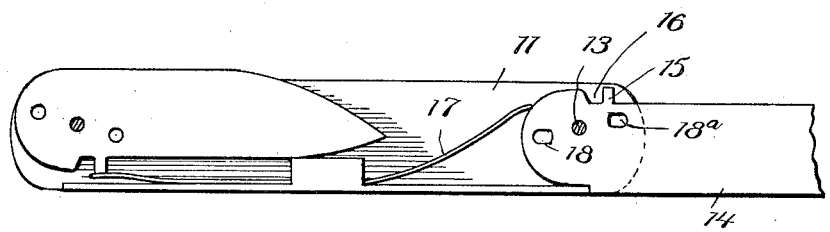
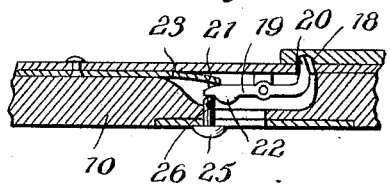
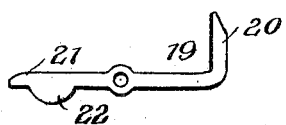
Inventor
Lauritz B. Larsen.
Witnesses
William Smith
P. G. Hoster
By Victor J. Evans
Attorney

UNITED STATES PATENT OFFICE.

LAURITZ B. LARSEN, OF NEW YORK, N. Y.

POCKET-KNIFE.

1,087,788.

Specification of Letters Patent.

Patented Feb. 17, 1914.

Application filed April 13, 1911. Serial No. 620,775.

*To all whom it may concern:*

Be it known that I, LAURITZ B. LARSEN, a subject of the King of Norway, residing at New York, in the county of New York and State of New York, have invented new and useful Improvements in Pocket-Knives, of which the following is a specification.

An object of the invention is to provide a pocket knife which can be automatically opened, the blades thereof being releasably locked when the same are moved to open position.

For the purpose mentioned, use is made of a handle having knife blades pivotally mounted thereon and foldable within the handle, a spring for engagement to the said knife blades and means on the handle for operating the said blades to move the same into open position and releasably lock the blades in open position.

Reference is to be had to the accompanying drawings constituting a part of this specification, in which similar characters of reference denote corresponding parts in all the views, and in which—

Figure 1 is a side elevation of my device, one of the blades being in open position, parts being broken away to disclose the underlying structure. Fig. 2 is a side elevation, one of the sides of the handle being removed to disclose the underlying structure, one of the blades being in closed position. Fig. 3 is a vertical section through a portion of my knife and showing the means for actuating the blades to open the same. Fig. 4 is an enlarged side elevation of the locking dog.

Referring more particularly to the views I employ a plurality of connectible sides 10, 11 constituting a handle 12, the said sides being connected by suitable cross pins or rivets. Mounted to swing between the sides 10, 11 on a pivot 13 is a knife blade 14, the said knife blade being normally foldable within the handle and adapted to be extended outwardly as shown in Fig. 1. The inner end of the knife blade 14 is preferably curved and has formed thereon a lug 15 adjacent which is provided a recess 16, and a spring 17 secured to the handle 12 has an end thereof engaging the inner curved portion of the knife blade 14 for a purpose that will be hereinafter more fully disclosed. The knife blade 14 is provided with a plurality of indentations 18, 18$^a$, the indentation 18$^a$ being in juxtaposition to the lug 15 and the indentation 18 being disposed adjacent the extreme inner end of the knife blade 14.

Pivotally mounted in the side 10 of the handle 12 and at one end thereof is a dog 19 having an integral locking pin 20, a bearing head 21 and a cam lug 22, the said locking pin 20 being formed at one end of the dog 19 and the said bearing head 21 and the said cam lug 22 being formed at the other end of the dog 19, the locking pin 20 being adapted to extend outwardly through a slot formed in the side 10. Secured to the side 10 is an operating button 25 having a pin 26 integrally formed thereon and adapted to engage the dog 19.

When the knife blade 14 is in closed position the locking pin 20 of the dog 19 will be disposed to extend into the indentation 18$^a$ of the knife blade 14, thus locking the blade within the handle 12, an end of a spring 23, secured to the handle 12, being in engagement with the bearing head 21 of the dog 19 to normally hold the locking pin 20 within the indentation 18$^a$. When the dog 19 is in the position mentioned to retain the blade 14 within the handle, the outer end of the pin 26 will engage the dog 19 immediately to the right of the cam lug 22. Now if it is desired to release the blade 14 so that the same will be thrown to open position by the spring 17 engaging the blade, the button 25 is slid in the groove formed in the side 10 so that the pin 26 will operate over the cam lug 22. As the end of the pin 26 is disposed to engage the end of the cam lug 22, the dog 19 will be operated so that the bearing head will be braced against the action of the spring 23 and the locking pin 20 will be disengaged from the knife blade 14, thus permitting the knife blade to be forced outwardly by the action of the spring 17 as mentioned. By moving the button 25 still farther in its path so that the end of the pin 26 will pass over the cam lug and engage the end of the dog 19 opposite to the bearing head 21, the dog 19 will assume its original position, that is, the locking pin 20 will be moved outwardly from the side 10 and the action of the spring 23 against the bearing head 21 will tend to retain the locking pin 20 in its outward position. The knife blade 14, however, having been moved to open position, the indentation 18 will be disposed to receive the end of the locking pin 20 similarly to the manner in which the indentation 18ª had previously received the locking pin 20. Thus it will be seen that when the locking pin 20 is disposed in the indentation 18, the knife blade 14 will be releasably locked in open position. To return the knife blade to closed position within the handle 12, the button 25 is operated so that the pin 26 will move over the cam lug 22, thus removing the locking pin 20 over the indentation 18 and permitting the user to move the knife blade in closed position within the handle. Now by moving the pin 26 past the cam lug 22 and into its original position, when the knife blade is moved to closed position the locking pin 20 will be redisposed in the indentation 18ª, thus releasably locking the knife blade in closed position and repositioning the spring 17 so that by simply moving the button 25 in the manner heretofore mentioned, the knife blade can be quickly released to assume an open position as heretofore described.

In the drawings I have disclosed a knife having a plurality of knife blades, one blade being mounted at each end of the handle and the said blades being similarly operable as described, the spring 17 being formed of an integral piece of material and having one of its ends in engagement with each of the knife blades and the spring 23 is also formed of an integral piece of material and has each of its ends in engagement with each of the dogs used in connection with each of the knife blades.

Although for the purpose of describing my device I have shown a particular construction, it will be understood that various changes in the fanciful designs can be made without departing from the spirit of the invention and the scope thereof is defined in the appended claim.

Having thus fully described the invention, what I claim as new, is:—

In a pocket knife, the combination with a slotted handle, of a knife blade pivoted to swing upon the handle, a lug struck from the knife blade and spaced from the ends thereof, a spring carried by the handle and having an end thereof normally abutting against the said lug when the knife blade is in closed position on the handle, the said spring being adapted to move the knife blade from closed to open position, a dog pivotally mounted within the neck, a lateral locking pin integral with the dog and projecting from one end thereof to extend into openings in the knife blade to lock the same in open or closed position, a lug formed on the dog between the ends thereof, a button provided with a shank and mounted to slide in the slot in the handle, and a spring for normally retaining the inner end of the dog in engagement with the shank of the button, the free end of the shank of the button being adapted to operate over the said cam lug to actuate the said dog against the action of the spring and to move the locking pin of the dog from one of the openings in the said knife blade.

In testimony whereof I affix my signature in presence of two witnesses.

LAURITZ B. LARSEN.

Witnesses:
EDWD. W. ARNE,
W. F. FOSS.

Copies of this patent may be obtained for five cents each, by addressing the "Commissioner of Patents, Washington, D. C."